United States Patent [19]

Raff et al.

[11] Patent Number: 5,267,439
[45] Date of Patent: Dec. 7, 1993

[54] METHOD AND ARRANGEMENT FOR CHECKING THE AGING CONDITION OF A CATALYZER

[75] Inventors: Lothar Raff, Remseck; Eberhard Schnaibel, Hemmingen, both of Fed. Rep. of Germany

[73] Assignee: Robert Bosch GmbH, Stuttgart, Fed. Rep. of Germany

[21] Appl. No.: 806,309

[22] Filed: Dec. 13, 1991

[30] Foreign Application Priority Data

Dec. 13, 1990 [DE] Fed. Rep. of Germany ....... 4039762

[51] Int. Cl.$^5$ .............................................. F01N 3/20
[52] U.S. Cl. ...................................... 60/274; 60/276; 60/277; 123/691
[58] Field of Search ......................... 60/276, 277, 274; 123/691

[56] References Cited

U.S. PATENT DOCUMENTS

| | | | |
|---|---|---|---|
| 3,962,866 | 6/1976 | Neidhard et al. | 60/276 |
| 3,969,932 | 7/1976 | Rieger | 60/277 |
| 4,622,809 | 11/1986 | Abthoff et al. | 60/274 |

Primary Examiner—Douglas Hart
Attorney, Agent, or Firm—Walter Ottesen

[57] ABSTRACT

The invention is directed to a method for checking the aging condition of a catalyzer by utilizing a lambda probe rearward of the catalyzer. For a transition from lean to rich which takes place within a pregiven time span, a check is made if an overshoot of the probe signal occurs which exceeds a pregiven amplitude. A conclusion is drawn as to the aging condition of the catalyzer from an overshoot when the latter occurs. Transitions between lean and rich and vice versa take place especially during the transition from overrun operation to controlled operation of the engine. Transitions of this kind have large swings of the signals of the lambda probes and this permits reliable measurements. In contrast, conventional methods operate exclusively when the engine to which the catalyzer belongs is lambda controlled. The relatively small signal amplitudes occurring thereby lead to a signal/noise ratio which is considerably poorer than in the methods according to the invention.

6 Claims, 2 Drawing Sheets

_5,267,439_

METHOD AND ARRANGEMENT FOR CHECKING THE AGING CONDITION OF A CATALYZER

FIELD OF THE INVENTION

The invention relates to a method and arrangement for checking the aging condition of a catalyzer by utilizing a lambda probe rearward of the catalyzer. With the measuring results from such methods, it is for example possible to change control parameters in dependence upon the aging condition of the catalyzer or to display that a catalyzer no longer operates well enough to keep the toxic substance content in the exhaust gas within pregiven limits.

BACKGROUND OF THE INVENTION

A method of the kind mentioned above is disclosed for example in U.S. Pat. No. 3,962,866. In this method, the difference of the amplitudes of the signals of two probes is formed of which one probe is disposed forward of the catalyzer and the other probe is disposed rearward of the catalyzer. The difference formation is only undertaken as long as the control is active. In this case, the signal of the probe forward of the catalyzer oscillates with a certain amplitude while the signal of the probe rearward of the catalyzer exhibits a rather constant value as long as the catalyzer is new. However, for a catalyzer which has aged, the signal of the probe rearward of the catalyzer also oscillates and with increasing amplitude for increasing age. The above-mentioned measured difference therefore becomes ever smaller with increasing age. If this difference drops below a threshold value, then a warning signal is emitted which indicates that the catalyzer should be exchanged.

U.S. Pat. No. 4,622,809 discloses a further method wherein, with the aid of a probe forward of the catalyzer, the control is adjusted to the smallest possible amplitude by the probe. Then, the amplitude of the signal of a probe rearward of the catalyzer is measured. The interrelationships described above between this amplitude and the aging condition of the catalyzer apply identically. As soon as the amplitude of the signal of the probe rearward of the catalyzer exceeds a threshold value, an indication is provided that the catalyzer should be exchanged. However, a signal of this kind is obtained also when the amplitude remains below the above-mentioned threshold value but the mean value of this signal does not lie within a pregiven mean value window.

In addition to the methods described above, other methods are known which all are characterized in that for a lambda controlled internal combustion engine, the signals of the probes forward and rearward of the catalyzer are set into relationship with each other. This fact that these known methods have been further modified shows that the problem to reliably determine the aging condition of a catalyzer remained.

SUMMARY OF THE INVENTION

The first embodiment of the method for checking the aging condition of a catalyzer utilizing a lambda probe rearward of the catalyzer includes the method steps of: for a transition from lean to rich which takes place within a pregiven time span, investigating if an overshoot of the probe signal occurs which exceeds a pregiven amplitude; and, drawing a conclusion as to the aging condition of the catalyzer from the overshoot upon the occurrence thereof.

The second embodiment of the method of the invention includes the steps of: for a transition from rich to lean which takes place within a pregiven time span, investigating if a forward swing of the probe signal occurs which exceeds a pregiven amplitude; and, drawing a conclusion as to the aging condition of the catalyzer from the forward swing upon the occurrence thereof.

The first method supplies clearly recognizable signals. The two methods can be utilized in common.

Both methods are distinguished in that measurements are no longer made while the internal combustion engine to which the catalyzer belongs is controlled to a lambda value as constant as possible; instead, measurements are made during transient operations with a large signal swing. It should here be noted that most internal combustion engines are controlled to a slightly rich lambda value since this makes it possible to hold the especially critical content of nitrogen oxide as small as possible. For controlled engines, the signal of the probe rearward of the catalyzer indicates a rich mixture. However, if such an engine enters into overrun operation, the metering of fuel is interrupted and the control is terminated. The probe then has a signal corresponding to a lean mixture. Transitions from lean to rich and vice versa accordingly correspond to transitions from overrun operation to the controlled condition of the engine and vice versa. Such transitions occur frequently during practical operation so that the measuring conditions required for the method of the invention are often satisfied. This is especially the case because the pregiven time span within which the transitions have to take place so that the signals can be purposefully evaluated are very long and typically exceed ten seconds. Almost every transition from overrun operation into the controlled operation and vice versa takes place in shorter time spans so that almost every transition of this kind is suitable for the measurement. The signal swings are considerably larger than those utilized in conventional methods which can only be carried out with controlled internal combustion engines. A signal swing of approximately 700 mV is typical between rich and lean. The signal swings of the forward swing or overshoot can be over 100 mV.

The arrangements according to the invention are so configured that the methods described above can be carried out therewith. The arrangements each include an aging detector which reaches a conclusion as to the aging condition of the catalyzer. The criteria according to which the conclusion is made are dependent especially on as to whether only overshoot signals or only forward swing signals or signals of both kinds are considered.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
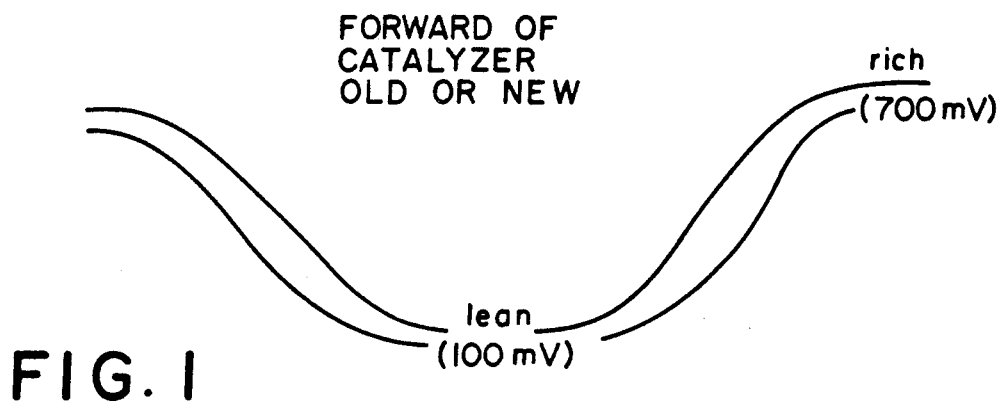
FIG. 1 is a diagram showing the trace of a signal of a lambda probe as a function of time with the lambda probe being arranged forward of a catalyzer during a transition from rich to lean and with a transition in the opposite direction.

FIG. 1 shows in the left-hand half the trace of the signal of a probe forward of a catalyzer with a transition from rich (800 mV) to lean (100 mV). The intense oscillating signal moves essentially between an upper and a lower envelope curve which are illustrated. To the right is the corresponding transition in the reverse direction from lean to rich.

Figure 2:
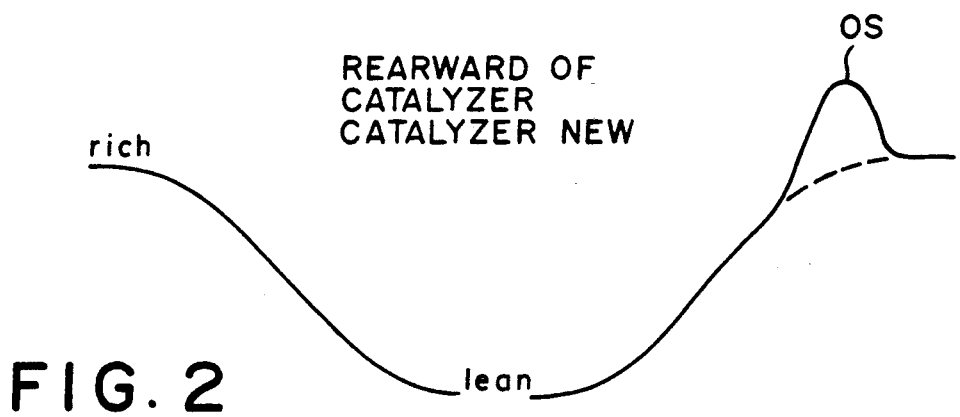
FIG. 2 is a diagram corresponding to FIG. 1 but wherein a probe is mounted rearward of a catalyzer with this catalyzer still being new.

FIG. 2 shows the corresponding signals for a probe arranged rearward of the catalyzer with the signal trace being for the case wherein the catalyzer is still new. Direct signal traces are shown in lieu of envelope curves. A difference compared to the signal of the probe forward of the catalyzer is that there are practically no oscillations of the signal present anymore. This is so because a new catalyzer and also a catalyzer which has not aged too much, averages oscillations in the lambda value, at least as long as these move within a certain lambda window. Another difference is that the probe signal has an overshoot OS for the transition from lean to rich. This overshoot always occurs when the transition from lean to rich takes place sufficiently fast and has a certain minimum height. Experiments have been conducted with several engines. Overshoots took place already for transitions from 590 mV to 680 mV. To determine the minimum permissible rate of change, the lambda value of the mixture supplied to the engines was changed in small increments. If the increments were selected so small that the transition from lean to rich was longer than 15 seconds, then no overshoot OS could be determined. At 10 seconds transition time and less, the overshoots were, in contrast, very pronounced. Minimum transition times of this kind occur continuously in practice for transitions from overrun operation into the controlled operation.

When utilizing a new catalyzer, the trace of the signal of the probe rearward of the catalyzer is essentially not dependent upon whether continuous or two-point control takes place. For two-point control, a control oscillation does take place ahead of the catalyzer and the amplitude thereof alternately indicates rich and lean mixture; however, these relatively rapid oscillations are averaged by the catalyzer. Therefore, the probe rearward of the catalyzer indicates the trace of the averaged lambda value.

Figure 3:
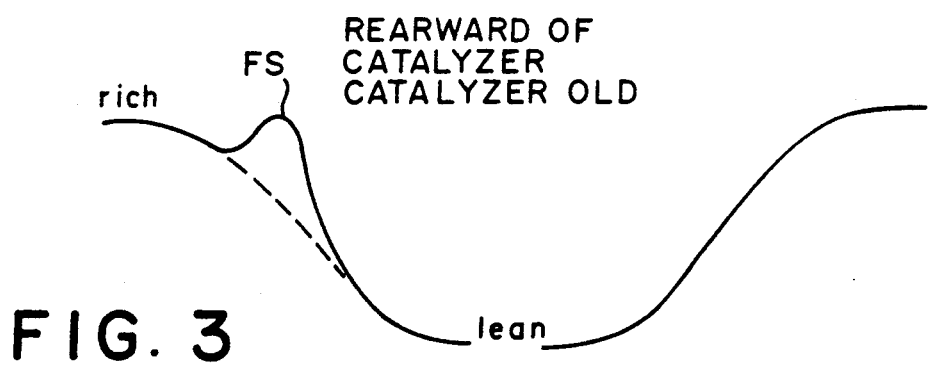
FIG. 3 is a diagram corresponding to that of FIG. 2 but with the catalyzer being aged.

The diagram of FIG. 3 also applies to the signal of the probe rearward of the catalyzer, however, for a very old catalyzer. In this case, a forward swing FS occurs with the transition from rich to lean while the overshoot OS during the transition from lean to rich is virtually no longer present.

From FIGS. 1 to 3, it is seen that the traces of the signals of a probe rearward of the catalyzer for transitions from lean to rich and/or vice versa permit a conclusion to be drawn as to the aging condition of the catalyzer and this is based upon the occurrence of overshoots for transitions from lean to rich (new catalyzer) or of forward swings for transitions from rich to lean (aged catalyzer).

Various methods are known from signal processing technology in order to determine overshoots or forward swings in a signal. One method for determining overshoots will be explained with reference to the flowchart of FIG. 4.

Figure 4:
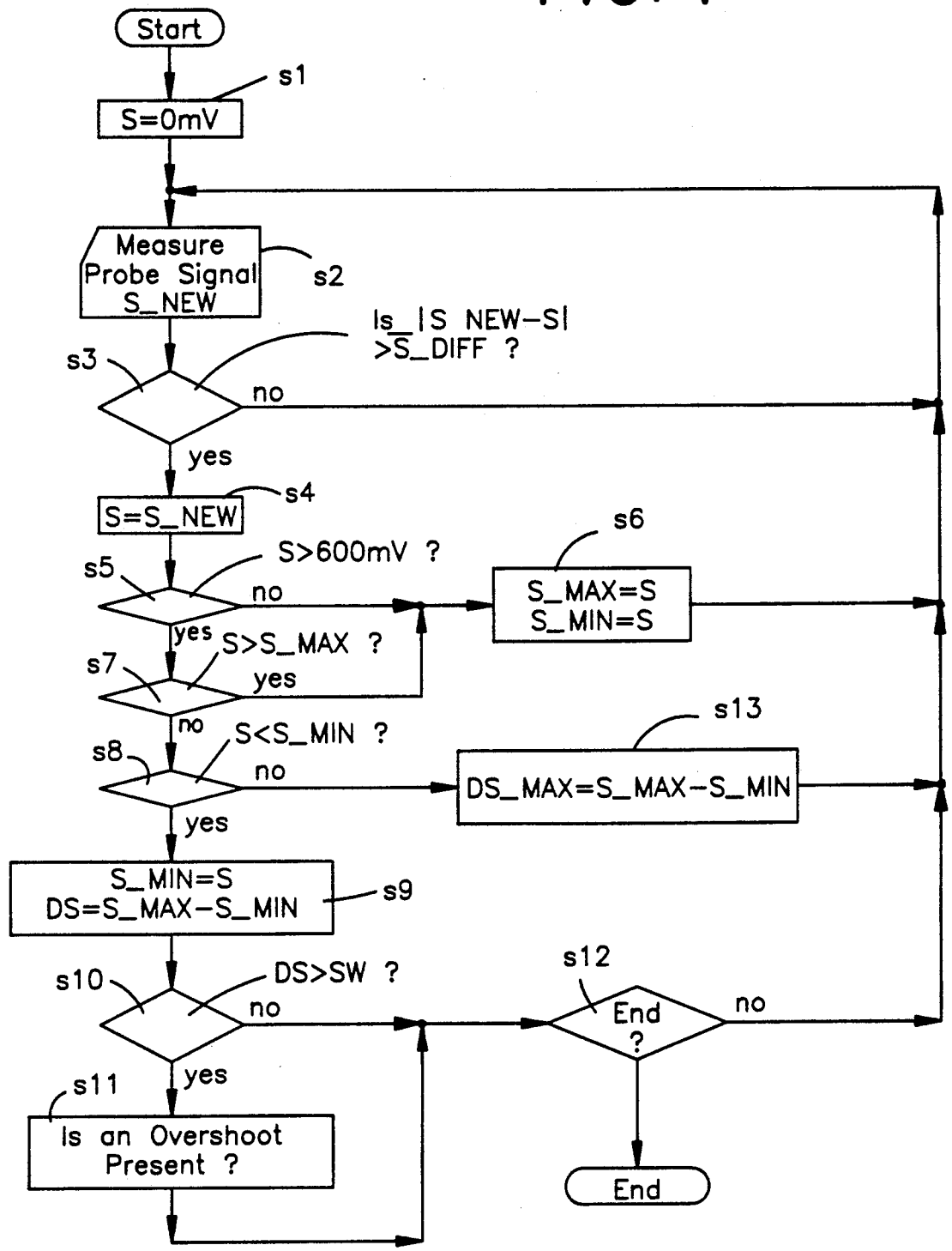
FIG. 4 is a flowchart for explaining the method as to how forward swings can be determined; and, FIG. 5 is a block diagram of an embodiment of the arrangement of the invention for determining the aging condition of a catalyzer.

In the method of FIG. 4, the value S for a measurement signal is set to 0 mV in a first step s1 after the start of the method. This step is not reached again in the further sequence.

The part of the method which is passed through repeatedly starts with a step s2 following the step s1. In step s2, the new value S_NEW of the probe signal is measured. In a step s3, an investigation is made as to whether the amount of the difference between S_NEW and S exceeds a pregiven difference S_DIFF. If this is not the case, the method returns to step s2 without further measures. This sequence serves to prevent further investigations from being started for small signal swings based upon disturbances or the like; instead, investigations are only made when the signal changes to such an extent that with great probability, an increase of the signal from lean to rich or a drop of the signal to the rear flank of an overshoot is present. A typical value for S_DIFF is approximately 20 mV.

If in contrast, the determination is made in step s3 that the pregiven difference is exceeded, then in step s4 the measured value S of the probe signal is first set to the value S_NEW so that the next time step s3 is reached, the above-mentioned comparison on the basis of the new value can be carried out. After the new value S is determined in step s4, an investigation is thereafter made in step s5 as to whether the value 600 mV has been exceeded. If this is not the case, then further investigations as to an overshoot are not appropriate since the overall voltage trace of an overshoot is at higher voltages. Accordingly, there is a return to step s2 via a step s6. In step s6, the values S_MAX and S_MIN are set to the signal value S. The purpose of this measure will become apparent from the further sequence of the method described below.

It is presumed that before the first satisfaction of step s5 at a transition from lean to rich, the probe signal has a value of 590 mV. Then S_MAX and S_MIN are set to this value in step s6.

After the next pass-through of steps s2 to s5, if it is detected in the last-mentioned step that the probe signal is more than 600 mV, then a check is made in step s7 as to whether the measured value exceeds the value S_MAX. This is the case as long as the probe signal continues to increase including the forward flank of the overshoot. The condition of step s7 is no longer satisfied only on the rearward flank of the overshoot. As long as the condition is satisfied, the above-mentioned step s6 follows step s7 wherein the values S_MAX and S_MIN are set to the measured value S. In the embodiment, this sequence takes place up to a probe voltage of approximately 800 mV.

As soon as the falling flank of the overshoot OS is reached, the probe voltage again assumes values less than 800 mV and the condition of step s7 is no longer satisfied. A check is then made in a step s8 as to whether the measured value S has dropped below the value S_MIN. This condition is satisfied as long as the value of the probe signal drops. The reason for this is that when the condition is satisfied, the value S_MIN, but not the value S MAX, is set to the value S in a subsequent step s9. In the above-mentioned step s9, the difference DS of the values S_MAX and S_MIN is formed, that is, the difference between the peak of the overshoot and the measured point just obtained on the rearward flank of the overshoot. If it develops that this difference value DS is above a threshold value SW, which is investigated in step s10, then in a step s11, the presence of an overshoot is determined and a flag is set which indicates the result of the determination. The threshold value for the embodiment amounts to 50 mV. If the determination is made in step s10 that the mentioned difference has not yet exceeded the threshold value SW because the overshoot is too small or the drop is not sufficiently far advanced, then a step s12 is reached which continues from step s11 wherein a check is made as to whether the method should be ended. As a condition for ending the method, that condition applies that the ignition of the engine system, on which the measurement is carried out, is switched off. If the end condition is satisfied, the end of the method has been reached. Otherwise, the sequences described above start again at step s2.

The continuation of the method is still open if, in step s8, the determination is made that the measured value S no longer is below the value S_MIN. This means that the lowest point of the overshoot is reached, in the embodiment approximately 700 mV, whereupon the voltage again increases slightly, for example up to 720 mV. As soon as the condition of the step s8 is no longer satisfied, then it is definite that the entire falling flank of the overshoot has been passed through. Accordingly, the maximum difference DS_MAX between the values S_MAX and S_MIN is computed in step s13. This difference can be utilized for quantitative evaluations whereas the result according to step s11 is only a qualitative determination.

As long as the internal combustion engine continues to be controlled in the rich region, the method continuously runs through only steps s2 and s3. During a transition from rich to lean, the steps s2 to s6 in contrast run sequentially. As long as there is a control in lean, the sequence is again limited to the steps s2 and s3. Only with a new transition from lean to rich are all the previously described steps s2 to s13 run through with the paths which are run through being dependent upon the particular satisfied conditions.

The determination of forward swings can take place in the same manner as the above-described determination of overshoots.

Experiments up until now have been conducted with conventional heated Nernst probes having a zircon oxide basis. Here, it has been determined that the effects described above are dependent essentially upon the aging condition of the catalyzer, but not upon the aging condition of the probes. It appears that no dependence upon the type of probe exists, thus, UEGO-probes have been shown to have the same effects as Nernst probes.

The method of invention utilizes transitions having large signal swings. For this reason, the embodiments of the method of the invention have a favorable signal/noise ratio. This reduces the danger of erroneous judgments. Erroneous judgments can be kept low in that the overshoots and forward swings are evaluated in common. If the mean value of overshoots and the mean value of forward swings during the same measurement period are equal, this is, for example, an indication that the measurement result cannot be relied upon. The same applies when both mean values are very low.

Figure 5:
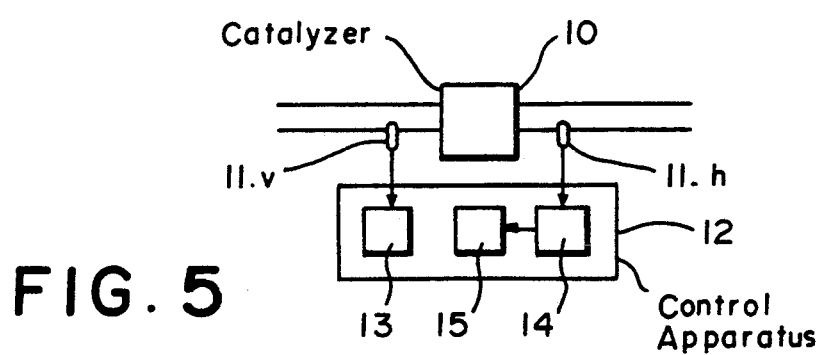

The block diagram of FIG. 5 includes a catalyzer 10 having a forward lambda probe 11.v arranged in the gas-flow direction ahead of the catalyzer and a rearward lambda probe 11.h arranged rearwardly of the catalyzer. Both probes supply their respective output signals to a control apparatus 12, especially to a lambda controller 13 or to an overshoot/forward-swing comparator 14. The comparator 14 supplies an overshoot or forward swing signal to an aging condition detector 15 which carries out the method shown in FIG. 4.

It is understood that the foregoing description is that of the preferred embodiments of the invention and that various changes and modifications may be made thereto without departing from the spirit and scope of the invention as defined in the appended claims.

What is claimed is:

1. A method for checking the state of deterioration of a catalytic converter by utilizing a lambda probe arranged rearward of the catalytic converter, the method comprising the steps of:

monitoring the output signal of said lambda probe during a transition taking place within a pregiven time span from a lean mixture composition, which is indicated by a low-level of said output signal, to a rich mixture composition, which is indicated by a high-level of said output signal;

checking said output signal while passing from said low-level to said high-level to determine if an overshoot occurs in the form of an excessive jump in said output signal which departs for a short time from the expected trace of said output signal;

determining if the amplitude of said overshoot exceeds a pregiven threshold amplitude; and, determining the state of deterioration of said catalytic converter from the occurrence of said overshoot having an amplitude exceeding said threshold amplitude.

2. The method of claim 1, the method comprising the further steps of:

for a transition from rich to lean, which takes place within a pregiven time span, investigating if a forward swing of the probe signal occurs which exceeds a pregiven amplitude; and, determining the state of deterioration of the catalytic converter from said forward swing upon the occurrence thereof.

3. A method for checking the state of deterioration of a catalytic converter by utilizing a lambda probe arranged rearward of the catalytic converter, the method comprising the steps of:

monitoring the output signal of said lambda probe during a transition taking place within a pregiven time span from a lean mixture composition, which is indicated by a low-level of said output signal, to a rich mixture composition, which is indicated by a high-level of said output signal;

checking if an overshoot occurs in the trace of said output signal in the form of a local maximum (OS) as said output signal moves from said low-level to said high-level;

determining if the amplitude of said overshoot exceeds a pregiven threshold amplitude; and, determining the state of deterioration of said catalytic converter from the occurrence of said overshoot having an amplitude exceeding said threshold amplitude.

4. A method for checking the state of deterioration of a catalytic converter by utilizing a lambda probe arranged rearward of the catalytic converter, the method comprising the steps of:

monitoring the output signal of said lambda probe during a transition taking place within a pregiven time span from a lean mixture composition, which is indicated by a low-level of said output signal, to a rich mixture composition, which is indicated by a high-level of said output signal;

checking if said output signal has an overshoot in the form of a short-term excessive increase at the start of the phase having said high-level;

determining if the amplitude of said overshoot exceeds a pregiven threshold amplitude; and, determining the state of deteriorations of said catalytic converter from the occurrence of said overshoot having an amplitude exceeding said threshold amplitude.

5. An arrangement for checking the aging condition of a catalyzer, the arrangement comprising:

a lambda probe supplying a probe signal and being mounted rearward of the catalyzer;

comparator means connected to said lambda probe for monitoring the probe signal of said lambda probe during a transition taking place within a pregiven time span from a lean mixture composition, which is indicated by a low-level of said probe signal, to a rich mixture composition, which is indicated by a high-level of said probe signal;

said comparator means being adapted for comparing the amplitude of an overshoot of said probe signal to a pregiven threshold amplitude while said probe signal moves between said low-level and said high-level during a transition from lean to rich within a pregiven time span;

said overshoot being in the form of an excessive jump in said probe signal which departs for a short time from an expected trace of said probe signal;

said comparator means being adapted to emit an overshoot signal in the event an amplitude of said overshoot exceeds said pregiven amplitude; and, an aging condition detector configured to determine the aging condition of the catalyzer based on said overshoot signal when said overshoot signal occurs.

6. An arrangement for checking the aging condition of a catalyzer, the arrangement comprising:

a lambda probe supplying a probe signal and being mounted rearward of the catalyzer;

comparator means connected to said lambda probe for monitoring the probe signal of said lambda probe during a transition taking place within a pregiven time span from a lean mixture composition, which is indicated by a low-level of said probe signal, to a rich mixture composition, which is indicated by a high-level of said probe signal;

said comparator means being adapted for comparing the amplitude of an overshoot of said probe signal to a pregiven threshold amplitude while said probe signal moves between said low-level and said high-level during a transition from lean to rich within a pregiven time span;

said overshoot occurring in the trace of said probe signal in the form of a local maximum (OS) as said probe signal moves from said low-level to said high-level;

said comparator means being adapted to emit a forward swing signal in the event said local maximum (OS) exceeds said pregiven amplitude; and, an aging condition detector configured to determine the aging condition of the catalyzer based on a forward swing signal when said forward swing signal occurs.

* * * * *